(12) United States Patent
Tateda et al.

(10) Patent No.: US 9,716,461 B2
(45) Date of Patent: Jul. 25, 2017

(54) MOTOR DRIVE HAVING FUNCTION OF DETECTING CIRCUIT ABNORMALITY OWING TO ENTERING FOREIGN MATTER BEFORE SIGNIFICANT ABNORMALITY OCCURS

(71) Applicant: FANUC CORPORATION, Yamanashi (JP)

(72) Inventors: Masaya Tateda, Yamanashi (JP); Akira Hirai, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/220,690

(22) Filed: Jul. 27, 2016

(65) Prior Publication Data

US 2017/0033723 A1 Feb. 2, 2017

(30) Foreign Application Priority Data

Jul. 31, 2015 (JP) ................. 2015-152807

(51) Int. Cl.
*H02H 7/09* (2006.01)
*H02P 29/00* (2016.01)
*H02P 27/06* (2006.01)

(52) U.S. Cl.
CPC ............. *H02P 29/00* (2013.01); *H02P 27/06* (2013.01)

(58) Field of Classification Search
CPC .......... H02P 27/04; H02P 27/06; H02P 21/00; H02P 6/00; H02P 23/00; H02P 25/00
USPC ............... 318/135, 148, 563, 565, 625, 650, 318/400.01, 700, 701, 779, 799, 800, 801, 318/430, 432, 437; 361/21, 22, 23, 30, 361/33, 34, 36, 42, 43, 56, 86, 90, 91.1, 361/93.9; 363/21.1, 40, 44, 95, 120, 174, 363/175
See application file for complete search history.

(56) References Cited

U.S. PATENT DOCUMENTS 4,884,182 A * 11/1989 Ando ................. H02M 5/4585
361/111

FOREIGN PATENT DOCUMENTS

JP 2007252134 A 9/2007

OTHER PUBLICATIONS

English Abstract and Machine Translation for Japanese Publication No. 2007-252134 A, published Sep. 27, 2007, 39 pgs.

* cited by examiner

*Primary Examiner* — Antony M Paul
(74) *Attorney, Agent, or Firm* — Fredrikson & Byron, P.A.

(57) ABSTRACT

A motor drive includes a DC power supply unit for rectifying electric power supplied from an AC power supply using a rectifier and smoothing the electric power using a capacitor; and a plurality of independent voltage measurement circuits for measuring the voltage of the DC power supply unit. The motor drive, which converts a DC voltage into an AC voltage to drive a motor, includes a voltage collection unit for collecting voltage information obtained from the voltage measurement circuits; a normal operation voltage information storage unit for storing a normal operation voltage; and an abnormality determination unit for identifying an intersection voltage of output signals based on voltage values collected by the voltage collection unit, comparing the intersection voltage with the normal operation voltage, and detecting a broken portion owing to (Continued)

entering foreign matter based on the difference between the intersection voltage and the normal operation voltage.

6 Claims, 13 Drawing Sheets

PRIOR ART

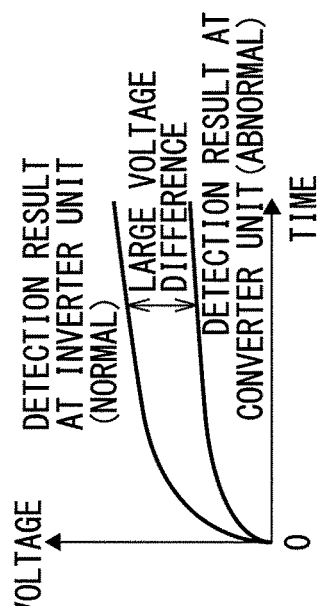
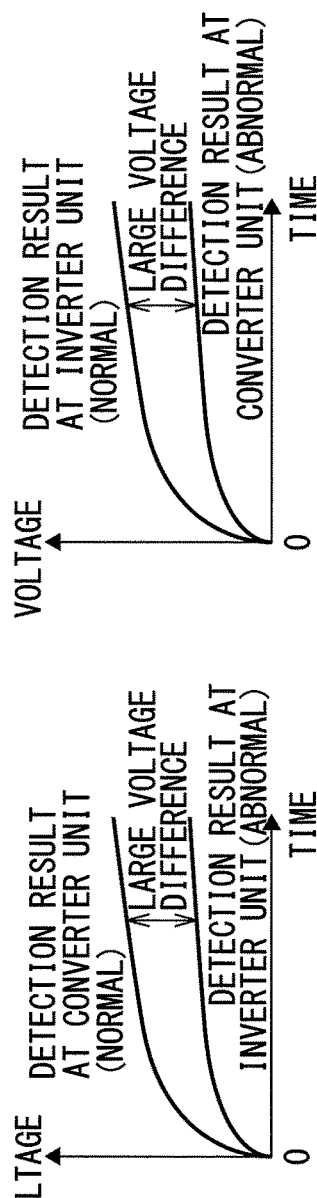
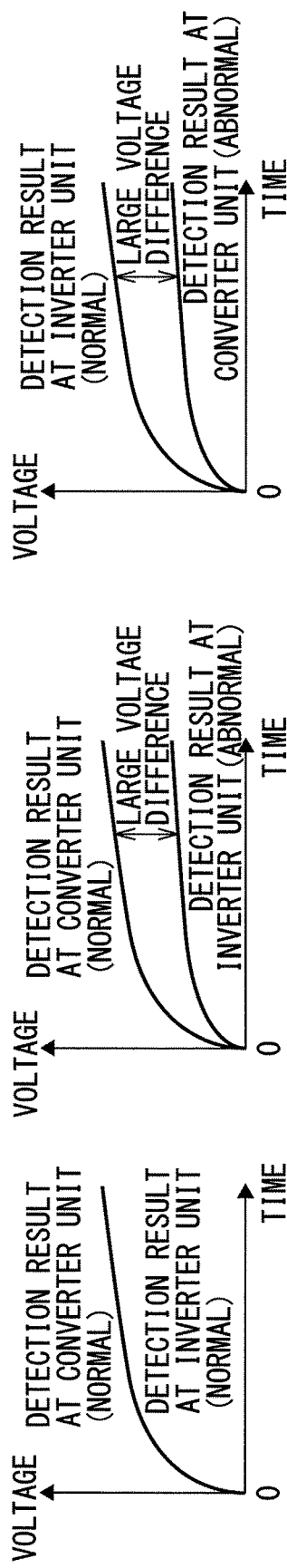
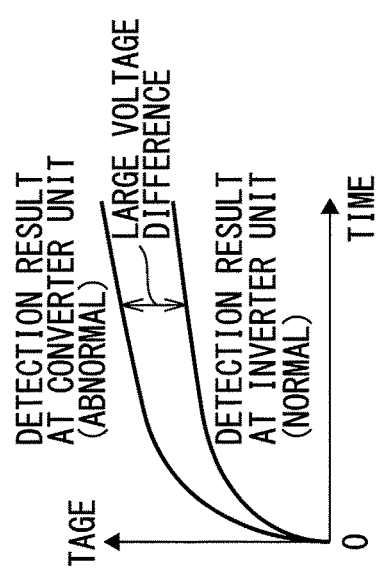
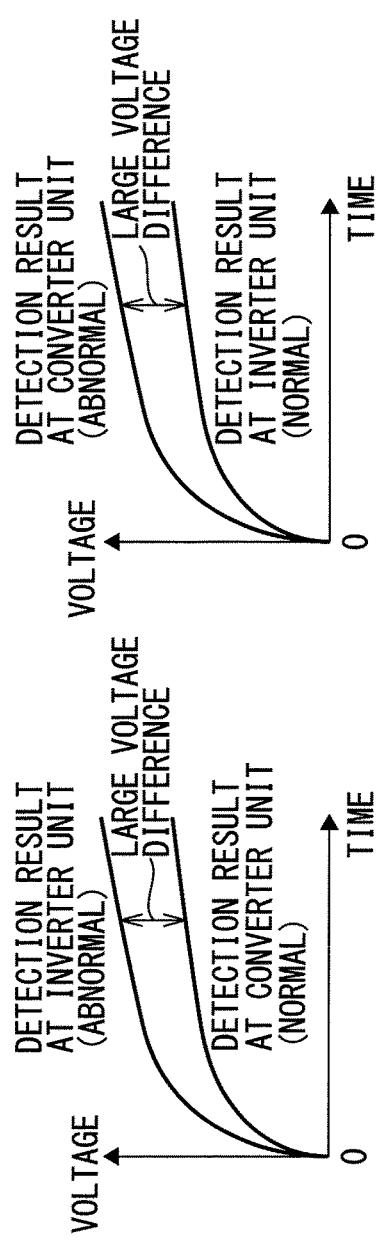

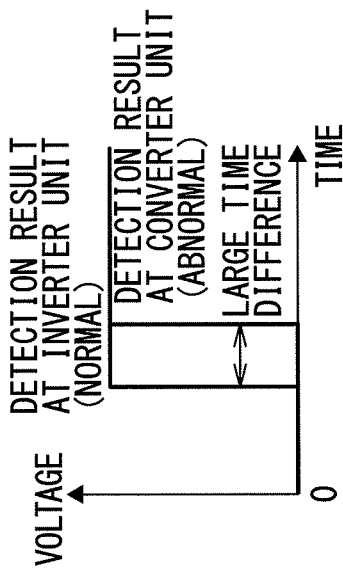
FIG. 7A
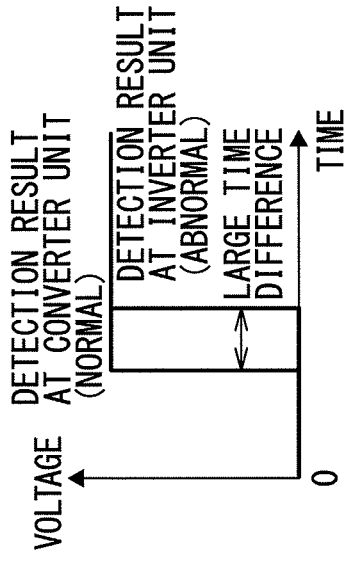
FIG. 7B
FIG. 7C
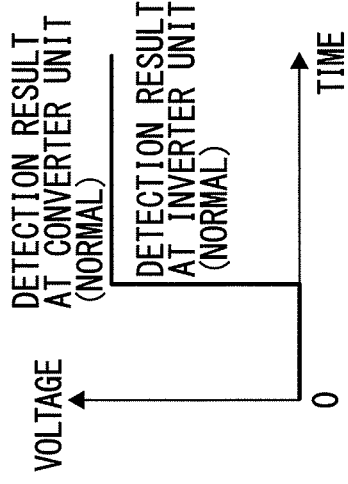
FIG. 7D
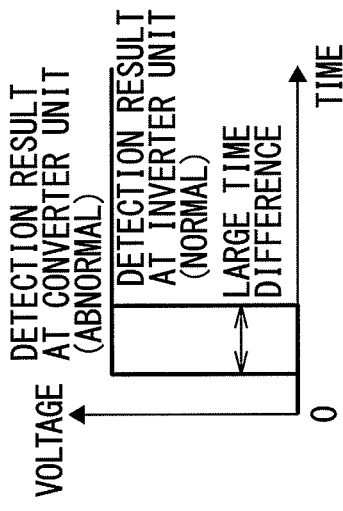
FIG. 7E
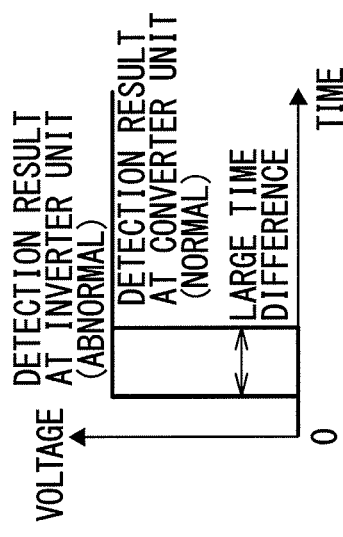

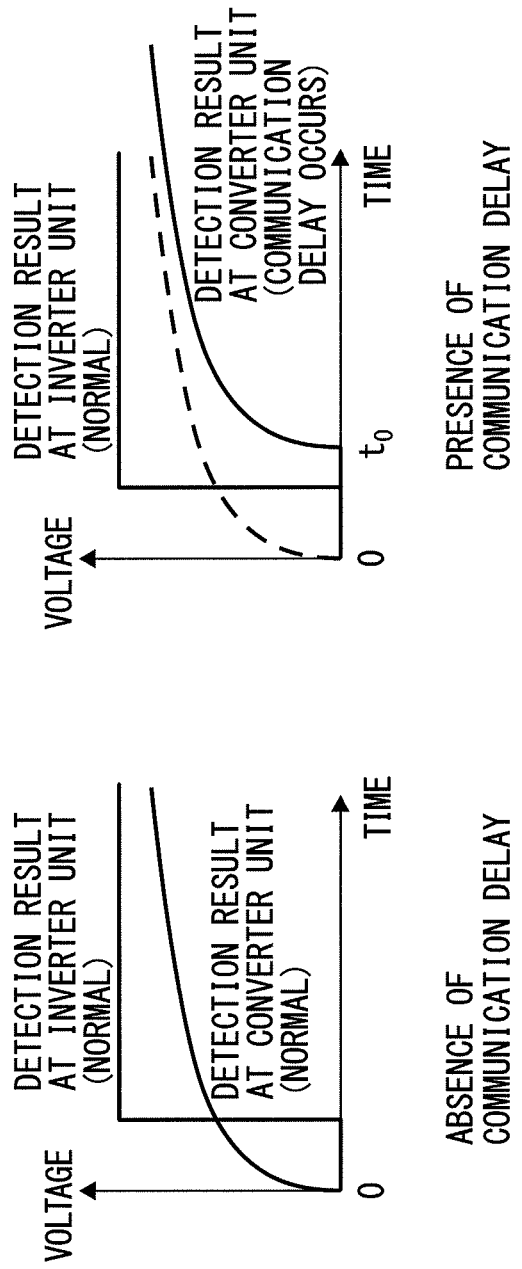

MOTOR DRIVE HAVING FUNCTION OF DETECTING CIRCUIT ABNORMALITY OWING TO ENTERING FOREIGN MATTER BEFORE SIGNIFICANT ABNORMALITY OCCURS

BACKGROUND OF THE INVENTION

1. Field of the Invention

The present invention relates to a motor drive to drive a motor, and specifically relates to a motor drive that detects a circuit abnormality owing to foreign matter having entered the motor drive, before a significant abnormality occurs in the motor drive.

2. Description of Related Art

Motor drives have the problem of foreign matter such as cutting oil entering the inside of the motor drives. The entering foreign matter may affect the characteristics of the motor drives and cause operational malfunctions. Particularly when miniaturized high resistance components are used, the entering foreign matter causes leakage current and lowers the resistance values of the components to less than their original values, thus deteriorating the circuit characteristics. To detect the foreign matter, a detection circuit is required to be separately provided.

This problem will be described in more detail. The motor drives contain various detection circuits. In particular, the motor drives need to measure a high voltage. Thus, resistors are used to divide the voltage to be detected. As resistors for dividing the voltage, resistors having a high resistance value are used in order to reduce current consumption and a loss of current flowing through the resistors during measurement.

Taking a high voltage measurement circuit 1000 shown in FIG. 1 as an example, a voltage measurement circuit 1003 measures a divided voltage. A voltage measurement result by the voltage measurement circuit 1003 is multiplied by a division ratio to calculate a high voltage value to be obtained. For example, when $R_1$ represents the resistance value of a resistor 1001, $R_2$ represents the resistance value of a resistor 1002, and V represents a measurement value of the voltage measurement circuit 1003, the voltage $V_0$ between two terminals 1004 and 1005, that is, a voltage to be measured is calculated by the following expression:

$$V_0 = (R_1 + R_2)/R_2 \times V$$

However, as the division ratio, there is no choice but to use a numerical value based on a design value. As a result, in the event that entering foreign matter alters the resistance value of the resistor 1001 or 1002 for dividing the voltage, a voltage measurement result after voltage division becomes abnormal, thus losing the ability to measure a normal voltage value. The entering foreign matter may form a path for leakage current that alters the characteristics of the high resistance component so as to have a lower resistance value than its original value, or may cause a wire break by corrosion.

As a device for detecting a circuit abnormality, a load driving device in which a plurality of detectors for detecting a voltage or a current are provided, and when at least one detection value exceeds a predetermined allowance, a broken portion is identified and operation is continued if possible is known (for example, Japanese Unexamined Patent Publication (Kokai) No. 2007-252134). The conventional art is based on the premise that the single detector by itself makes a determination of normal or abnormal. If the single detector cannot make a determination of normal or abnormal, an abnormality cannot be detected.

SUMMARY OF THE INVENTION

The purpose of the present invention is to detect a circuit abnormality owing to entering foreign matter and "identify a circuit abnormal portion "without adding detection circuit and increasing cost, which is a problem to be solved of the above-described conventional art.

A motor drive according to an embodiment of the present invention includes a direct current (DC) power supply unit for rectifying electric power supplied from an alternating current (AC) power supply using a rectifier circuit and smoothing the electric power using a capacitor, and a plurality of independent voltage measurement circuits for measuring the voltage of the DC power supply unit. The motor drive converts a DC voltage from the DC power supply unit into an AC voltage to drive a motor. The motor drive includes a voltage collection unit for collecting voltage information obtained from the plurality of voltage measurement circuits, a normal operation voltage information storage unit for storing a normal operation voltage, and an abnormality determination unit for identifying an intersection voltage of output signals based on voltage values collected by the voltage collection unit, comparing the intersection voltage with the normal operation voltage, and detecting a broken portion as a result of foreign matter based on the difference between the intersection voltage and the normal operation voltage.

BRIEF DESCRIPTION OF THE DRAWINGS

The objects, features, and advantages of the present invention will be more apparent from the following description of embodiments in conjunction with the attached drawings, wherein:

FIGS. 6A to 6E are graphs of measurement examples in a case where a detection method of using analog-to-digital conversion to calculate a numerical value is adopted for both the converter unit and the inverter unit, in the motor drive according to the first embodiment of the present invention;

FIGS. 7A to 7E are graphs of measurement examples in a case where a detection method to switch a signal at a certain threshold value is adopted for both the converter unit and the inverter unit, in the motor drive according to the first embodiment of the present invention;

FIG. 13A is a graph showing an example of a case where voltage measurement results by voltage measurement circuits used in the motor drive according to the third embodiment of the present invention are normal; and FIG. 13B is a graph showing an example of a case where a voltage measurement result by the voltage measurement circuit used in the motor drive according to the third embodiment of the present invention is abnormal.

DETAILED DESCRIPTION OF THE INVENTION

A motor drive according to the present invention will be described below with reference to the drawings.

First Embodiment

Figure 4:
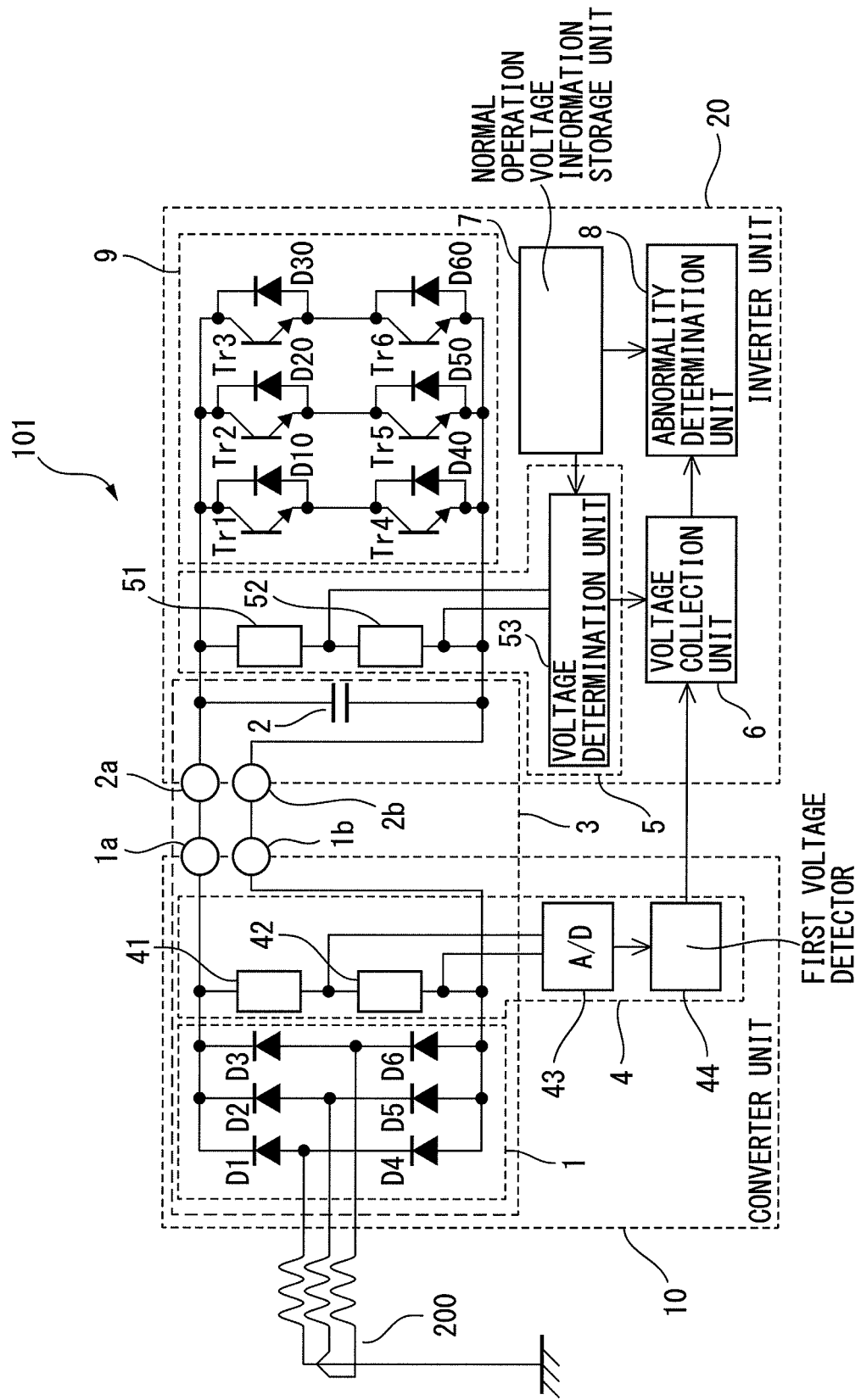
FIG. 4 is a block diagram of the motor drive according to the first embodiment of the present invention.

A motor drive according to a first embodiment of the present invention will be described with reference to the drawings. FIG. 4 is a block diagram of a motor drive 101 according to the first embodiment of the present invention. The motor drive 101 according to the first embodiment of the present invention includes a direct current (DC) power supply unit 3 for rectifying electric power supplied from an alternating current (AC) power supply 200 using a rectifier circuit 1 and smoothing the electric power using a capacitor 2, and a plurality of independent voltage measurement circuits 4 and 5 for measuring the voltage of the DC power supply unit 3. The motor drive 101 converts a DC voltage from the DC power supply unit 3 into an AC voltage to drive a motor. The motor drive 101 includes a voltage collection unit 6, a normal operation voltage information storage unit 7, and an abnormality determination unit 8.

The voltage collection unit 6 collects voltage information obtained from the plurality of voltage measurement circuits 4 and 5. The normal operation voltage information storage unit 7 stores a normal operation voltage. The abnormality determination unit 8 identifies an intersection voltage of output signals based on voltage values collected by the voltage collection unit 6, compares the intersection voltage with the normal operation voltage, and detects a broken portion owing to entering foreign matter based on the difference between the intersection voltage and the normal operation voltage.

The present invention is characterized in that the plurality of voltage measurement circuits provided in the motor drive each measure the voltage of the DC power supply unit and a circuit abnormality is detected based on measurement results.

Thus, the voltage measurement circuits used in the motor drive according to the first embodiment of the present invention will be first described.

Figure 1:
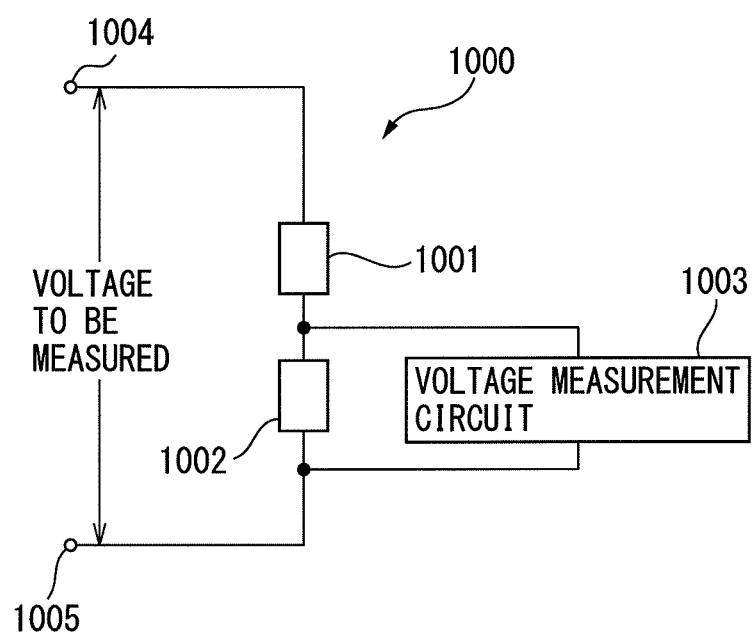
FIG. 1 is a block diagram showing an example of a conventional voltage measurement circuit.
Figure 2:
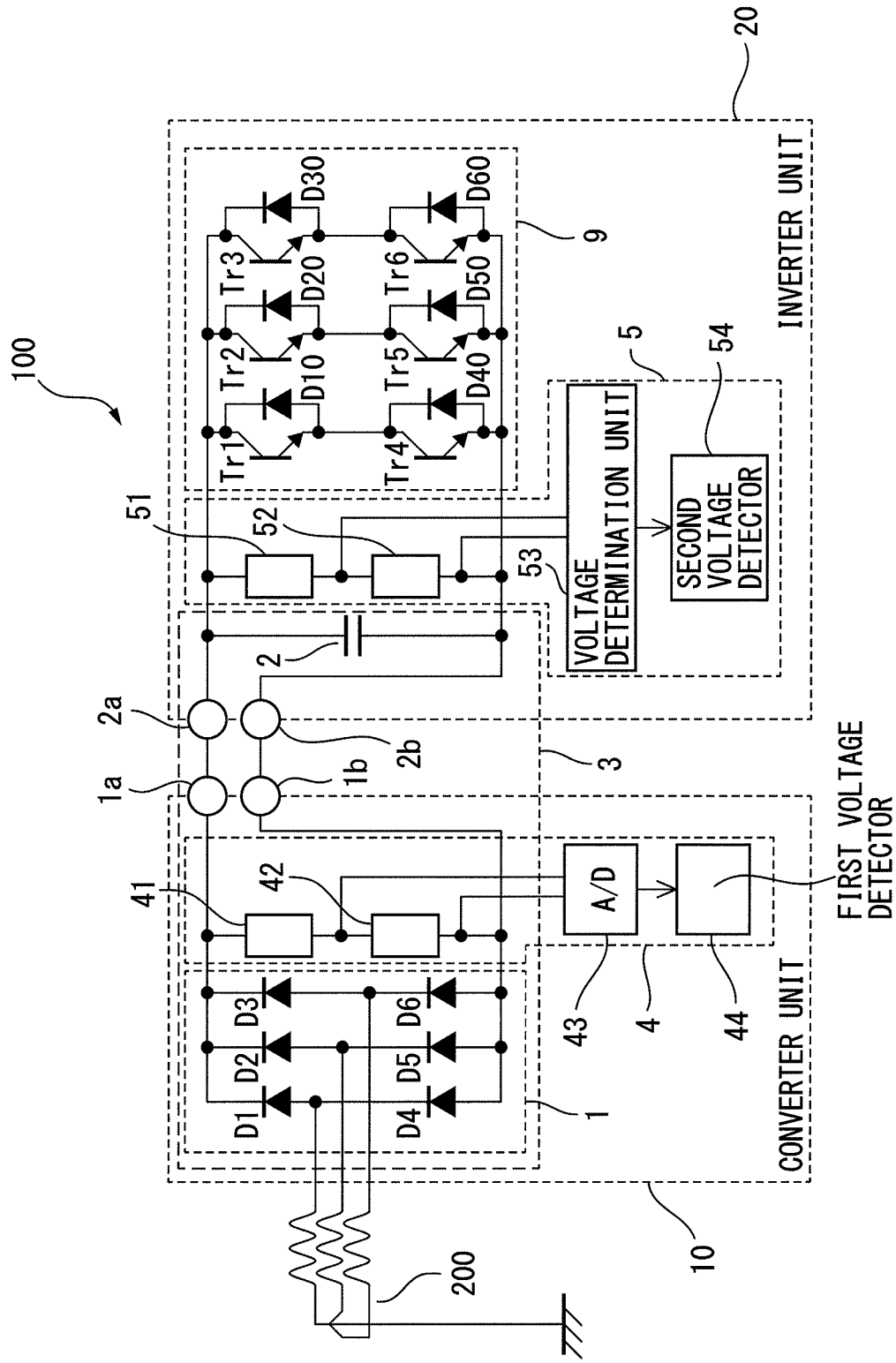
FIG. 2 is a block diagram showing an example of voltage measurement circuits used in a motor drive according to a first embodiment of the present invention.

FIG. 2 is a block diagram of a motor drive 100 in which only the voltage measurement circuits used in the motor drive according to the first embodiment of the present invention are drawn. The motor drive 100 is divided into a converter unit 10 and an inverter unit 20. The converter unit 10 and the inverter unit 20 are connected through terminals 1a and 1b of the converter unit 10 and terminals 2a and 2b of the inverter unit 20, by way of example. However, the converter unit 10 and the inverter unit 20 may be integrated into one unit.

An AC voltage from the AC power supply 200 is rectified by the rectifier circuit 1 having diodes D1 to D6, and smoothed by the capacitor 2. A first voltage measurement circuit 4 and a second voltage measurement circuit 5 each measure the voltage between terminals of the capacitor 2, that is, the voltage of the DC power supply unit 3.

The first voltage measurement circuit 4 is a voltage measurement circuit for which a detection method of using analog-to-digital conversion to calculate a numerical value is adopted. The first voltage measurement circuit 4 includes resistors 41 and 42 connected in series between the terminals of the capacitor 2, an analog-to-digital (A/D) converter 43, and a first voltage detector 44. When $r_1$ and $r_2$ represent the resistance values of the resistors 41 and 42, respectively, and $V_1$ represents a voltage applied to the resistor 42, the voltage $V_{c1}$ across the capacitor 2 is calculated from the following expression:

$$V_{c1}=(r_1+r_2)/r_2 \times V_1$$

Figure 3A:
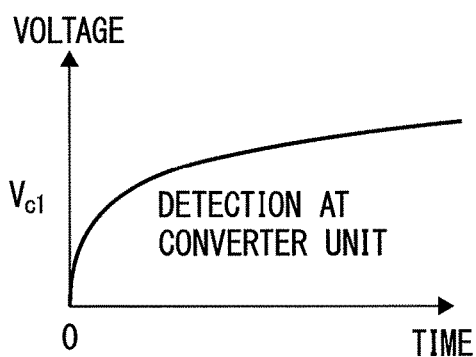
FIG. 3A is a graph showing an example of a voltage measurement result of the voltage measurement circuit in a converter unit used in the motor drive according to the first embodiment of the present invention.

Provided that the capacitor 2 is fully discharged, the voltage $V_{c1}$ across the capacitor 2 varies with time as shown in FIG. 3A.

On the other hand, in the inverter unit 20, an inverter 9 converts the DC voltage smoothed by the capacitor 2 into an AC voltage to drive a motor (not shown). The inverter 9 includes six transistors Tr1 to Tr6 and diodes D10 to D60 provided in parallel to the transistors Tr1 to Tr6.

The inverter unit 20 includes the second voltage measurement circuit 5 to measure the voltage between the terminals of the capacitor 2. The second voltage measurement circuit 5 is a voltage measurement circuit for which a detection method to switch a signal at a certain threshold value is adopted. The second voltage measurement circuit 5 includes resistors 51 and 52, a voltage determination unit 53 for determining whether or not a detected voltage is higher than a predetermined voltage and outputting a high level signal when the detected voltage is higher, and a second voltage detector 54.

When $r_3$ and $r_4$ represent the resistance values of the resistors 51 and 52, respectively, and $V_2$ represents a voltage applied to the resistor 52, the voltage $V_{c2}$ across the capacitor 2 is calculated from the following expression:

$$V_{c2}=(r_3+r_4)/r_4 \times V_2$$

Figure 3B:
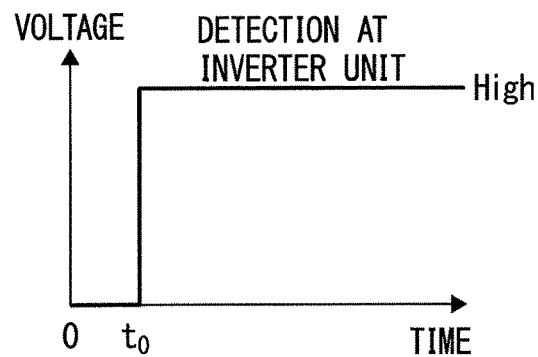
FIG. 3B is a graph showing an example of a voltage measurement result of the voltage measurement circuit in an inverter unit used in the motor drive according to the first embodiment of the present invention.

Provided that the capacitor 2 is fully discharged, the voltage between the terminals of the capacitor 2 increases with time. When a measurement value $V_{c2}$ exceeds a predetermined threshold value $V_{th}$, an output signal turns high. FIG. 3B shows an example of a variation in the output signal of the second voltage measurement circuit 5 with time. In FIG. 3B, the measurement value $V_{c2}$ becomes equal to $V_{th}$ at a time $t_0$.

As described above, according to the motor drive according to the first embodiment of the present invention, the two voltage measurement circuits each measure the voltage between the terminals of the capacitor 2, and an abnormality in the resistor 41, 42, 51, or 52 provided in each of the voltage measurement circuits can be detected by comparing measurement values.

Thus, as shown in FIG. 4, the motor drive 101 according to the first embodiment of the present invention further includes the voltage collection unit 6, the normal operation voltage information storage unit 7, and the abnormality determination unit 8, in order to make a comparison between the voltage of the DC power supply unit 3 (the voltage between the terminals of the capacitor 2) detected by the first voltage measurement circuit 4 and the voltage of the DC power supply unit 3 (the voltage between the terminals of the capacitor 2) detected by the second voltage measurement circuit 5. Note that, the voltage collection unit 6, the normal operation voltage information storage unit 7 for storing normal operation voltage information of the voltage measurement circuit, and the abnormality determination unit 8 are provided in the inverter unit 20 in FIG. 4 by way of example, but may be provided in the converter unit 10.

The voltage collection unit 6 collects the measurement values of the voltage between the terminals of the capacitor 2 from the first voltage measurement circuit 4 and the second voltage measurement circuit 5. The normal operation voltage information storage unit 7 stores the normal operation voltage information, that is, the threshold value $V_{th}$ with which the voltage determination unit 53 compares a voltage measurement result. The abnormality determination unit 8 determines the presence or absence of a circuit abnormality based on the voltage measurement results collected by the voltage collection unit 6. Note that, the voltage collection unit 6 includes the second voltage detector 54 shown in FIG. 2.

Figure 5A:
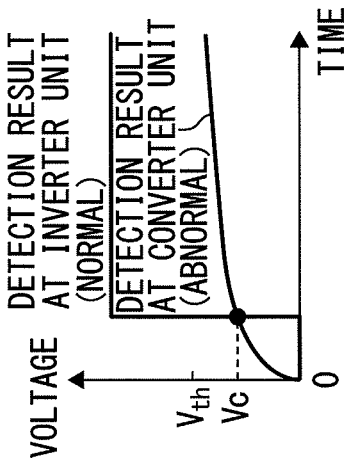
FIG. 5A is a graph showing an example of a case where voltage measurement results by the voltage measurement circuits used in the motor drive according to the first embodiment of the present invention are normal.
Figure 5B:
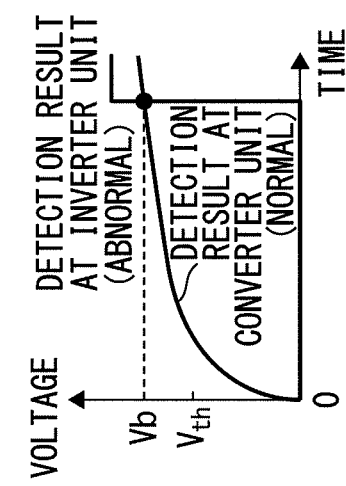
FIGS. 5B to 5E are graphs showing examples of cases where voltage measurement results by the voltage measurement circuits used in the motor drive according to the first embodiment of the present invention are abnormal.

FIG. 5A shows an example of a case where voltage measurement results by the voltage measurement circuits used in the motor drive according to the first embodiment of the present invention are normal. FIGS. 5B to 5E show examples of cases where voltage measurement results by the voltage measurement circuits used in the motor drive according to the first embodiment of the present invention are abnormal. When superimposing a measurement result (hereinafter referred to as "converter unit detection result") by the first voltage measurement circuit 4 provided in the converter unit 10 on a measurement result (hereinafter referred to as "inverter unit detection result") by the second voltage measurement circuit 5 provided in the inverter unit 20, as shown in FIG. 5A, the measurement results intersect at a point. An intersection voltage of these output signals is referred to as Va. When both the first voltage measurement circuit 4 and the second voltage measurement circuit 5 are normal, the intersection voltage Va coincides with $V_{th}$, which is the normal operation voltage. Thus, the abnormality determination unit 8 determines that both the first voltage measurement circuit 4 and the second voltage measurement circuit 5 are normal based on the fact that Va is equal to $V_{th}$.

Figure 5C:
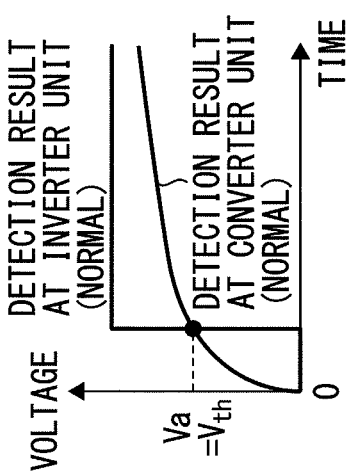
Figure 5D:
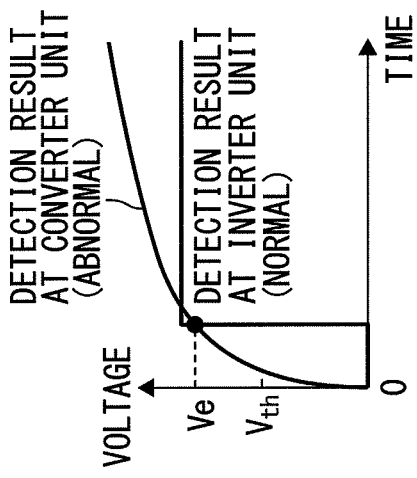
Figure 5E:
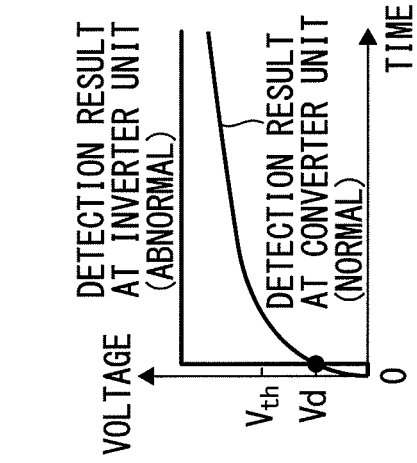

FIGS. 5B to 5E show examples of measurement results when at least any one of the first voltage measurement circuit 4 and the second voltage measurement circuit 5 is abnormal. For example, in FIG. 5B, since an intersection voltage between the converter unit detection result and the inverter unit detection result is Vb, which is higher than $V_{th}$, at least any one of the first voltage measurement circuit 4 and the second voltage measurement circuit 5 is determined to be abnormal. Likewise, FIG. 5C shows an example of an intersection voltage $Vc<V_{th}$, FIG. 5D shows an example of an intersection voltage $Vd<V_{th}$, and FIG. 5E shows an example of an intersection voltage $Ve>V_{th}$, and therefore at least any one of the first voltage measurement circuit 4 and the second voltage measurement circuit 5 is determined to be abnormal.

Even if both the first voltage measurement circuit 4 and the second voltage measurement circuit 5 are abnormal, an intersection voltage between the converter unit detection result and the inverter unit detection result is possibly equal to the normal operation voltage in theory. However, it is conceivable that the occurrence of abnormalities in a plurality of resistors, out of the resistors 41, 42, 51, and 52, at the same time such that an intersection voltage coincides with the normal operation voltage is very rare. For this reason, when an intersection voltage coincides with the normal operation voltage, both the first voltage measurement circuit 4 and the second voltage measurement circuit 5 are determined to be normal.

In the measurement examples shown in FIGS. 5A to 5E, the detection method of using analog-to-digital conversion to calculate a numerical value is adopted for the voltage measurement circuit of the converter unit 10, while the detection method to switch a signal at a certain threshold value is adopted for the voltage measurement circuit of the inverter unit 20. However, measurement is not limited to these examples.

FIGS. 6A to 6E show measurement examples in a case where the detection method of using analog-to-digital conversion to calculate a numerical value is adopted for both the converter unit 10 and the inverter unit 20, and a determination of normal or abnormal is made based on the difference between detected voltage values. FIG. 6A shows a case where both the converter unit and the inverter unit are normal and thus both measurement results coincide with each other.

FIGS. 6B to 6E show examples of measurement results in cases where at least any one of the first voltage measurement circuit 4 and the second voltage measurement circuit 5 is abnormal. For example, in FIG. 6B, while a converter unit detection result is normal, a measurement voltage as an inverter unit detection result is abnormally low, so that at least any one of the first voltage measurement circuit 4 and the second voltage measurement circuit 5 is determined to be abnormal based on the fact that the voltage difference therebetween is more than a predetermined value. In FIG. 6C, while an inverter unit detection result is normal, a measurement voltage as a converter unit detection result is abnormally low, so that at least any one of the first voltage measurement circuit 4 and the second voltage measurement circuit 5 is determined to be abnormal based on the fact that the voltage difference therebetween is more than the predetermined value. In FIG. 6D, while a converter unit detection result is normal, a measurement voltage as an inverter unit detection result is abnormally high, so that at least any one of the first voltage measurement circuit 4 and the second voltage measurement circuit 5 is determined to be abnormal based on the fact that the voltage difference therebetween is more than the predetermined value. In FIG. 6E, while an inverter unit detection result is normal, a measurement voltage as a converter unit detection result is abnormally high, so that at least any one of the first voltage measurement circuit 4 and the second voltage measurement circuit 5 is determined to be abnormal based on the fact that the voltage difference therebetween is more than the predetermined value. In this manner, an abnormality can be detected even in a case where the detection method of using analog-to-digital conversion to calculate a numerical value is adopted for both the converter unit 10 and the inverter unit 20.

FIGS. 7A to 7E show measurement examples in a case where the detection method to switch a signal at a certain threshold value is adopted for both the converter unit 10 and the inverter unit 20, and a determination of normal or abnormal is made based on the difference between the times of switching voltage values. FIG. 7A shows a case where both the converter unit and the inverter unit are normal, and thus both measurement results coincide with each other.

FIGS. 7B to 7E show examples of measurement results in cases where at least any one of the first voltage measurement circuit 4 and the second voltage measurement circuit 5 is abnormal. For example, in FIG. 7B, while a converter unit detection result is normal, a measurement voltage as an inverter unit detection result abnormally delays, so that at least any one of the first voltage measurement circuit 4 and the second voltage measurement circuit 5 is determined to be abnormal based on the fact that the time difference therebetween is more than a predetermined value. In FIG. 7C, while an inverter unit detection result is normal, a measurement voltage as a converter unit detection result abnormally delays, so that at least any one of the first voltage measurement circuit 4 and the second voltage measurement circuit 5 is determined to be abnormal based on the fact that the time difference therebetween is more than the predetermined value. In FIG. 7D, while a converter unit detection result is normal, a measurement voltage as an inverter unit detection result abnormally advances, so that at least any one of the first voltage measurement circuit 4 and the second voltage measurement circuit 5 is determined to be abnormal based on the fact that the time difference therebetween is more than the predetermined value. In FIG. 7E, while an inverter unit detection result is normal, a measurement voltage as a converter unit detection result abnormally advances, so that at least any one of the first voltage measurement circuit 4 and the second voltage measurement circuit 5 is determined to be abnormal based on the fact that the time difference therebetween is more than the predetermined value. In this manner, it is possible to detect an abnormality even in a case where the detection method to switch a signal at a certain threshold value is adopted for both the converter unit 10 and the inverter unit 20.

Figure 8:
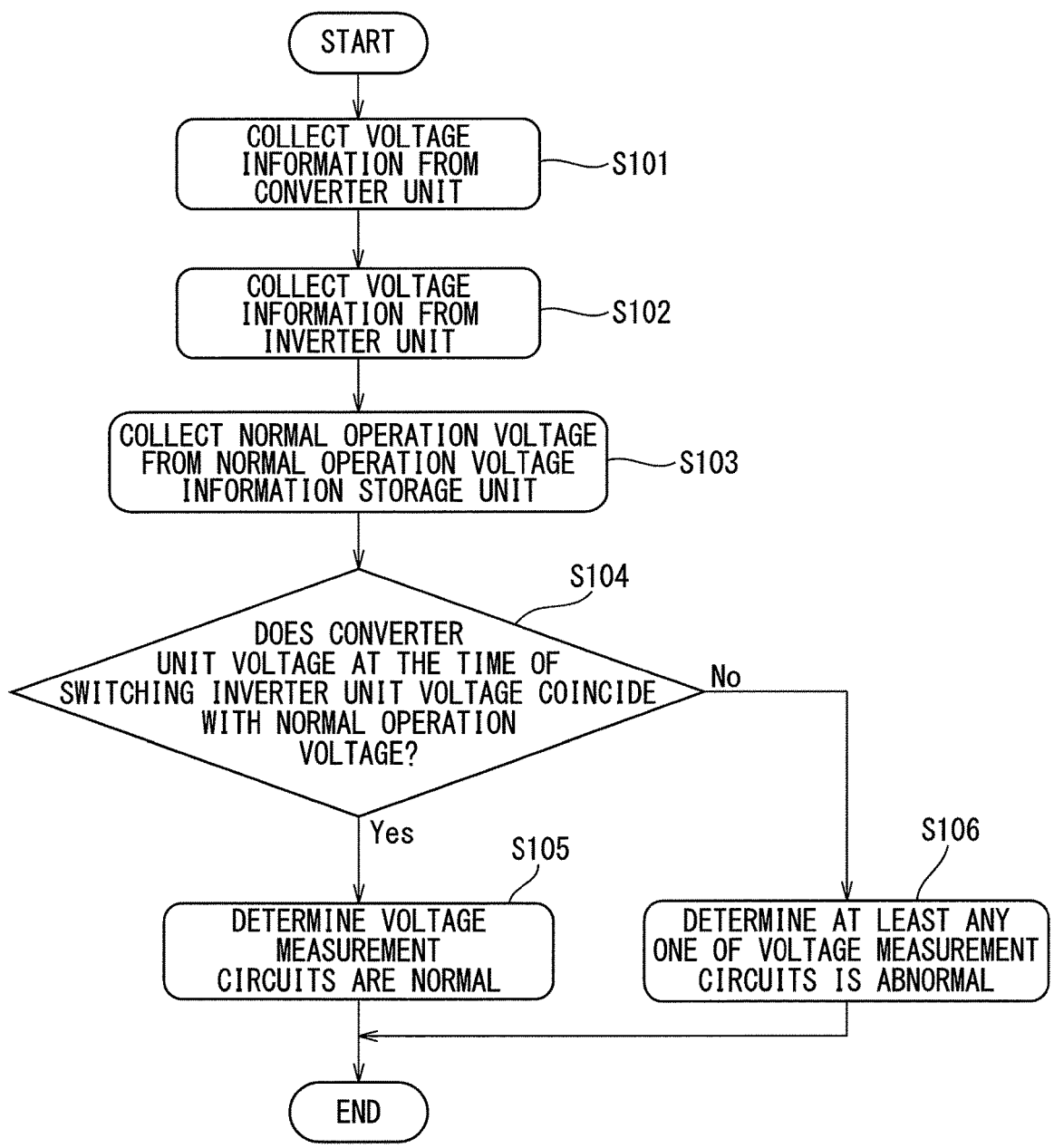
FIG. 8 is a flowchart for explaining the operation of the motor drive according to the first embodiment of the present invention.

Next, the operation of the motor drive according to the first embodiment of the present invention will be described with reference to a flowchart shown in FIG. 8. First, in step S101, voltage information is collected from the converter unit 10. More specifically, the voltage collection unit 6 collects a measurement result of the voltage between the terminals of the capacitor 2 measured by the first voltage measurement circuit 4 provided in the converter unit 10.

Next, in step S102, voltage information is collected from the inverter unit 20. More specifically, the voltage collection unit 6 collects a measurement result of the voltage between the terminals of the capacitor 2 measured by the second voltage measurement circuit 5 provided in the inverter unit 20.

The voltage collection unit 6 calculates an intersection voltage between the measurement result of the voltage (converter unit voltage) between the terminals of the capacitor 2 measured by the first voltage measurement circuit 4 and the measurement result of the voltage (inverter unit voltage) between the terminals of the capacitor 2 measured by the second voltage measurement circuit 5, in other words, the converter unit voltage at the time of switching the inverter unit voltage.

Next, in step S103, a normal operation voltage is collected from the normal operation voltage information storage unit 7. More specifically, the abnormality determination unit 8 collects an intersection voltage in a state where the first voltage measurement circuit 4 and the second voltage measurement circuit 5 are normal, which has been already stored in the normal operation voltage information storage unit 7.

Next, in step S104, whether or not the converter unit voltage at the time of switching the inverter unit voltage coincides with the normal operation voltage is determined.

When the converter unit voltage at the time of switching the inverter unit voltage coincides with the normal operation voltage, in step S105, both the voltage measurement circuit 4 and the second voltage measurement circuit 5 are determined to be normal.

On the other hand, when the converter unit voltage at the time of switching the inverter unit voltage does not coincide with the normal operation voltage, in step S106, at least any one of the first voltage measurement circuit 4 and the second voltage measurement circuit 5 is determined to be abnormal.

As described above, the two voltage measurement circuits each measure the voltage between the terminals of the capacitor 2, and the presence or absence of an abnormality in the voltage measurement circuits is detected based on measurement results.

In the above description of the motor drive according to the first embodiment of the present invention, the detection method of using analog-to-digital conversion to calculate a numerical value is adopted for the first voltage measurement circuit 4, while the detection method to switch a signal at a certain threshold value is adopted for the second voltage measurement circuit 5, by way of example. However, measurement is not limited to this example. The detection method to switch a signal at a certain threshold value may be adopted for the first voltage measurement circuit 4, while the detection method of using analog-to-digital conversion to calculate a numerical value may be adopted for the second voltage measurement circuit 5. In addition, the detection method of using analog-to-digital conversion to calculate a numerical value, or the detection method to switch a signal at a certain threshold value may be adopted for the first voltage measurement circuit 4 and the second voltage measurement circuit 5.

In the voltage measurement circuits used in the motor drive according to the first embodiment of the present invention, components susceptible to entering foreign matter are preferably situated within an area for measuring the voltage of the DC power supply unit. Moreover, the components susceptible to the entering foreign matter preferably affect the measurement of the voltage of the DC power supply unit.

Figure 9:
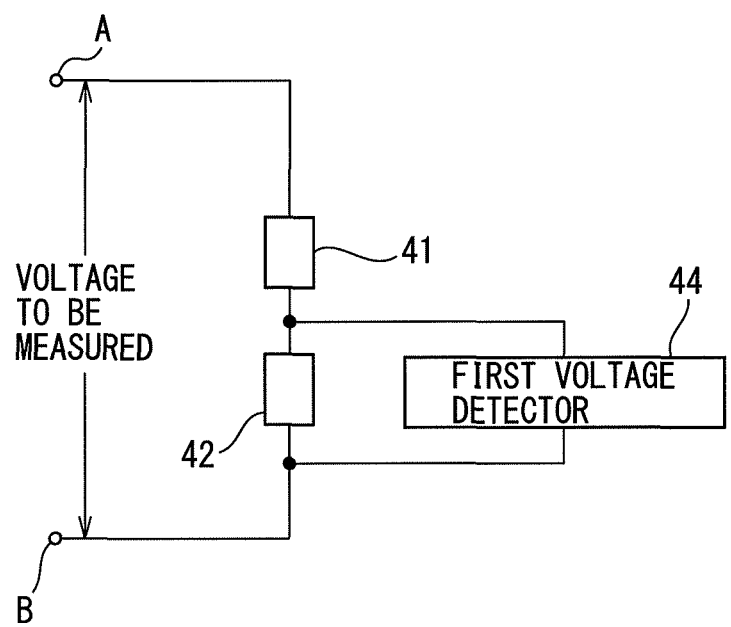
FIG. 9 is a block diagram of a modification example of the voltage measurement circuit of the motor drive according to the first embodiment of the present invention.

FIG. 9 shows a modified example of the voltage measurement circuit used in the motor drive according to the first embodiment of the present invention. Resistors 41 and 42 are connected in series to terminals A and B the voltage between which is to be measured, and a first voltage detector 44 measures a voltage applied to the resistor 42.

The resistors 41 and 42, which are small in component size and originally have high resistance values, may have lower resistance values than their original values, because entering foreign matter such as cutting oil deteriorates electrical insulation. Also, the use of a corrodible material increases the possibility of a break due to the entering foreign matter. Furthermore, disposing these components along an air way causes the components to be more susceptible to the entering foreign matter.

The voltage measurement circuits described in the first embodiment preferably use these characteristics for the purpose of increasing measurement sensitivity. As a result, the circuits that detect a break owing to entering foreign matter tend to be broken earlier than any other circuit in the motor drive, thus allowing preventive maintenance of the entire motor drive.

Also, in the voltage measurement circuit as shown in FIG. 9, an abnormality in any component affects a measurement result, thus allowing the rapid detection of a break.

Second Embodiment

Figure 10:
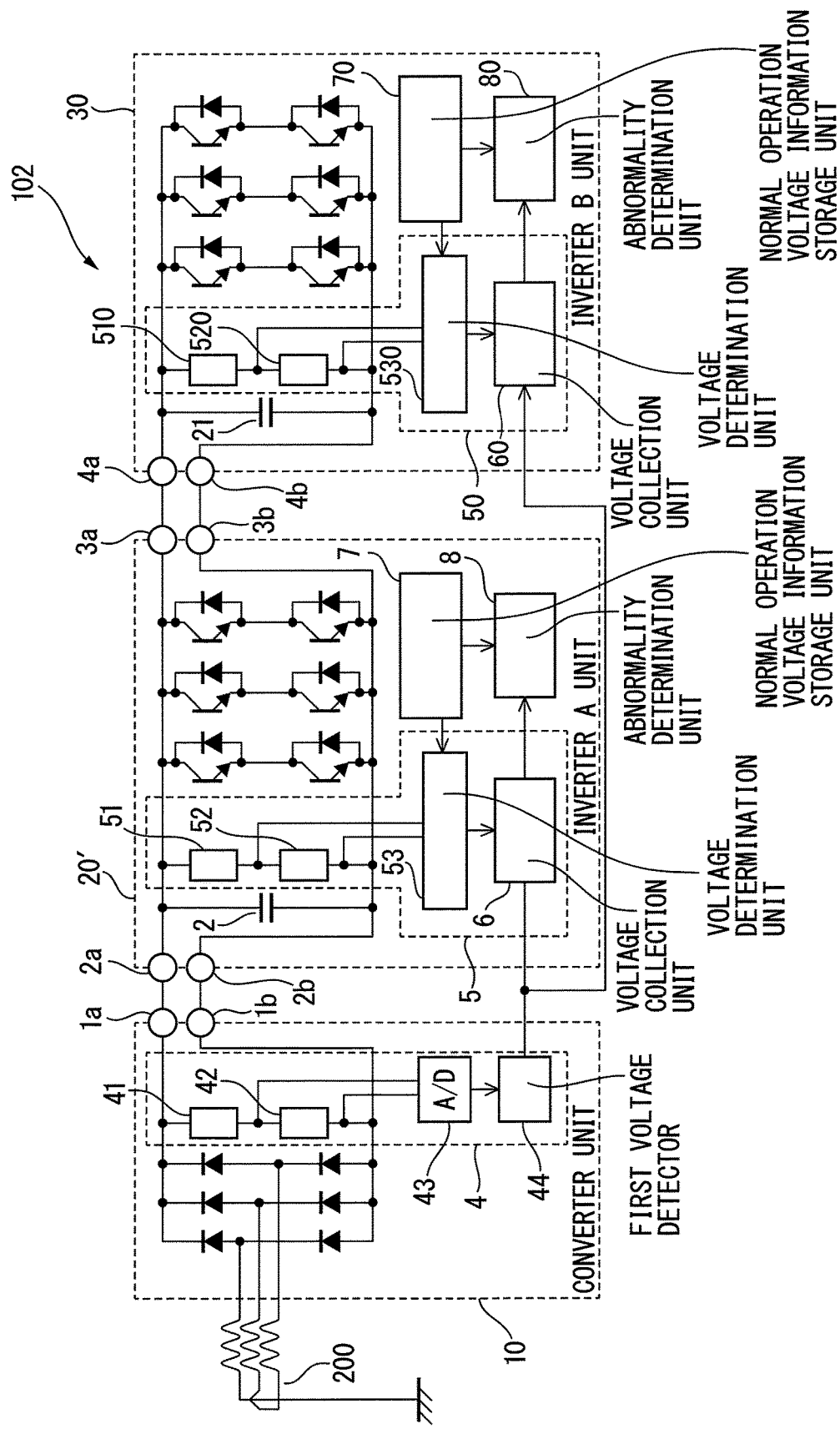
FIG. 10 is a block diagram of a motor drive according to a second embodiment of the present invention.

A motor drive according to a second embodiment of the present invention will be described. FIG. 10 is a block diagram of a motor drive 102 according to the second embodiment of the present invention. The difference between the motor drive 102 according to the second embodiment and the motor drive 101 according to the first embodiment is that the motor drive 102 is provided with three or more voltage measurement circuits (4, 5, and 50) to measure the voltage of a DC power supply unit, and determines a broken portion affected by entering foreign matter, when any one of voltage detection levels is abnormal. The other configurations of the motor drive 102 according to the second embodiment are the same as those of the motor drive 101 according to the first embodiment, so detailed description will be omitted.

The motor drive 102 according to the second embodiment has two inverter units, one of which is referred to as an inverter A unit 20' and the other of which is referred to as an inverter B unit 30. The inverter A unit 20' and the inverter B unit 30 are connected through terminals 3a, 3b, 4a, and 4b. The inverter B unit 30 includes a third voltage measurement circuit 50 to measure the voltage between the terminals of a capacitor 21. The third voltage measurement circuit 50 includes resistors 510 and 520, a second voltage determination unit 530, and a second voltage collection unit 60. Furthermore, the inverter B unit 30 includes a second normal operation voltage information storage unit 70 and a second abnormality determination unit 80.

Figure 11A:
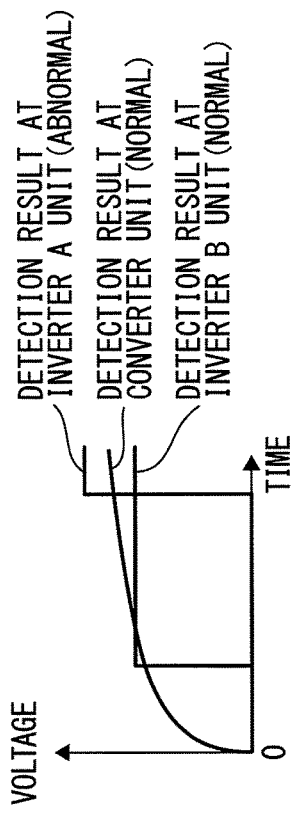
FIG. 11A is a graph showing an example of a case where voltage measurement results by voltage measurement circuits used in the motor drive according to the second embodiment of the present invention are normal.
Figure 11B:
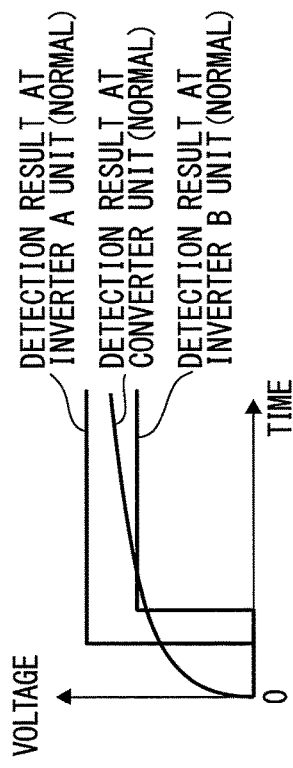
FIGS. 11B to 11D are graphs showing examples of cases where voltage measurement results by the voltage measurement circuits used in the motor drive according to the second embodiment of the present invention are abnormal.
Figure 11C:
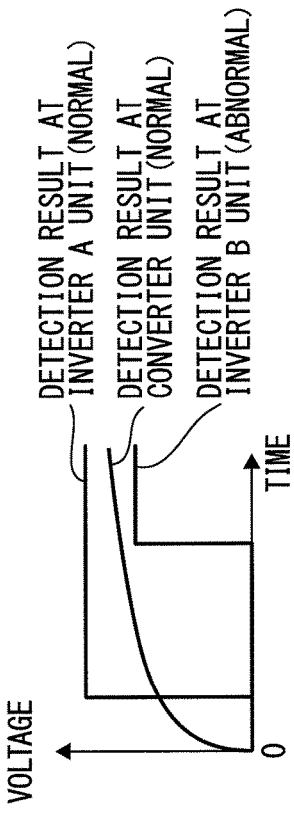
Figure 11D:
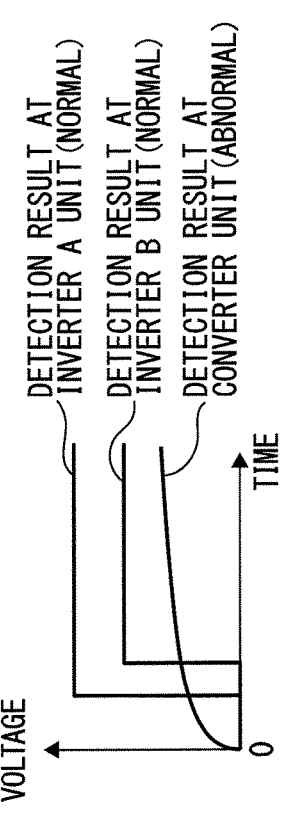

FIG. 11A shows an example of a case where voltage measurement results by voltage measurement circuits used in the motor drive according to the second embodiment of the present invention are normal, while FIGS. 11B to 11D show examples of cases where voltage measurement results are abnormal. Provided that a motor drive has two voltage measurement circuits, when any one of the voltage measurement circuits is abnormal, it is impossible to determine which of the two voltage measurement circuits is abnormal. However, if a motor drive has three voltage measurement circuits, it is possible to determine which circuit is abnormal. FIGS. 11B to 11D go as follows:

(1) First Case (FIG. 11B)

A voltage value detected by a converter unit at the switching timing of a signal of the inverter A unit does not coincide with the voltage value of normal operation.

The voltage value detected by the converter unit at the switching timing of a signal of the inverter B unit coincides with the voltage value of normal operation.

In this case, the inverter A unit is determined to have a circuit abnormality.

(2) Second Case (FIG. 11C)

A voltage value detected by the converter unit at the switching timing of a signal of the inverter A unit coincides with the voltage value of normal operation.

The voltage value detected by the converter unit at the switching timing of a signal of the inverter B unit does not coincide with the voltage value of normal operation.

In this case, the inverter B unit is determined to have a circuit abnormality.

(3) Third Case (FIG. 11D)

A voltage value detected by the converter unit at the switching timing of a signal of the inverter A unit does not coincide with the voltage value of normal operation.

The voltage value detected by the converter unit at the switching timing of a signal of the inverter B unit does not coincide with the voltage value of normal operation.

In this case, the converter unit is determined to have a circuit abnormality, since it seems to be a very rare case where both the inverter A unit and the inverter B unit are abnormal at the same time.

As described above, the motor drive according to the second embodiment can determine an abnormal portion from measurement results of the voltage of the DC power supply unit.

Third Embodiment

Figure 12:
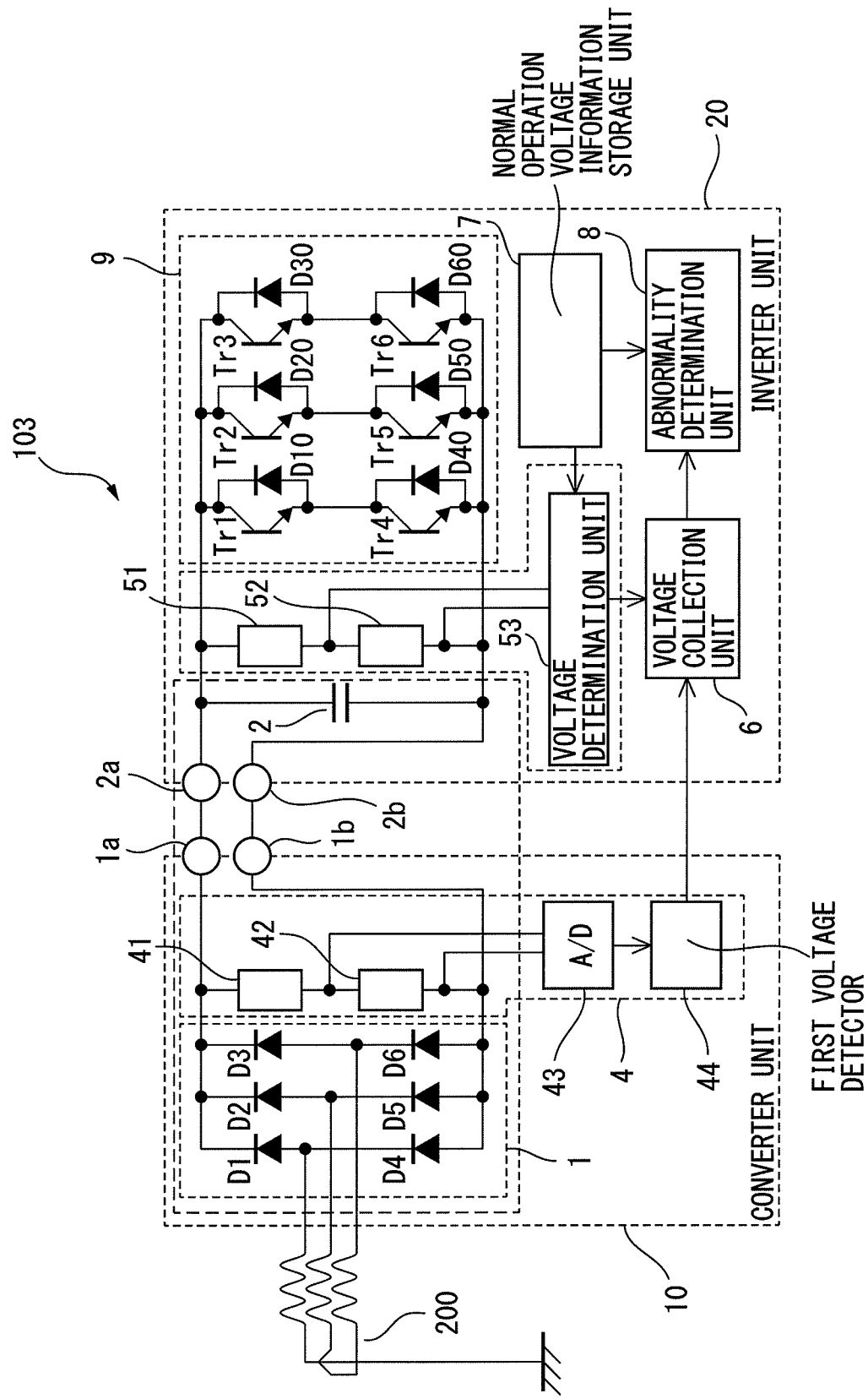
FIG. 12 is a block diagram of a motor drive according to a third embodiment of the present invention.

Next, a motor drive according to a third embodiment of the present invention will be described. FIG. 12 is a block diagram of a motor drive 103 according to the third embodiment of the present invention. The difference between the motor drive 103 according to the third embodiment and the motor drive 101 according to the first embodiment is that when voltage information is collected from a plurality of voltage measurement circuits for measuring the voltage of a DC power supply unit, a communication delay between the voltage measurement circuits is calculated and added to the diagnosis of voltage detection levels. The other configurations of the motor drive 103 according to the third embodiment are the same as those of the motor drive 101 according to the first embodiment, so detailed description will be omitted.

When voltage information is collected to a voltage collection unit 6, communication of the voltage information may be established between modules. In this case, the communication may have a delay. When there is no communication delay, a converter unit detection result and an inverter unit detection result are obtained as shown in FIG. 13A. On the contrary, when there is a communication delay in communication of a voltage measurement result from a converter unit, as shown in FIG. 13B, simply overlaying obtained information may cause a false determination of an abnormality. Thus, in the motor drive according to the third embodiment of the present invention, the communication delay is added in advance, and when overlaying the voltage information, a correction is made to allow a precise comparison.

For example, when a converter unit detection result is transmitted to the voltage collection unit 6 with a delay of time $t_0$ owing to a communication delay, as shown by a solid line in FIG. 13B, a correction is made so as to increase a voltage from a time 0 as shown by a dashed line, in consideration of the time $t_0$, thus allowing precise measurement.

The motor drives according to the embodiments of the present invention can detect a circuit abnormality owing to entering foreign matter, before a significant abnormality occurs in the motor drives, and can identify a circuit abnormal portion without the addition of a specific detection circuit and an increase in cost.

What is claimed is:
1. A motor drive including
a direct current (DC) power supply unit for rectifying electric power supplied from an alternating current (AC) power supply using a rectifier circuit and smoothing the electric power using a capacitor; and a plurality of independent voltage measurement circuits for measuring the voltage of the DC power supply unit;
the motor drive converting a DC voltage from the DC power supply unit into an AC voltage to drive a motor, the motor drive comprising:
a voltage collection unit for collecting voltage information obtained from the plurality of voltage measurement circuits;
a normal operation voltage information storage unit for storing a normal operation voltage; and
an abnormality determination unit for identifying an intersection voltage of output signals based on voltage values collected by the voltage collection unit, comparing the intersection voltage with the normal operation voltage, and detecting a broken portion owing to entering foreign matter based on the difference between the intersection voltage and the normal operation voltage.

2. The motor drive according to claim 1, wherein at least any one of a detection method of using analog-to-digital conversion to calculate a numerical value and a detection method to switch a signal at a certain threshold value is adopted for the plurality of voltage measurement circuits.

3. The motor drive according to claim 1, wherein a component susceptible to the entering foreign matter is situated within an area for measuring the voltage of the DC power supply unit.

4. The motor drive according to claim 1, wherein a component susceptible to the entering foreign matter affects measurement of the voltage of the DC power supply unit.

5. The motor drive according to claim 1, wherein three or more of the voltage measurement circuits for measuring the voltage of the DC power supply unit are provided; and
the broken portion affected by the entering foreign matter is identified based on the fact that only one of the voltage measurement circuits has an abnormal voltage detection level.

6. The motor drive according to claim 1, wherein when the voltage information is collected from the plurality of voltage measurement circuits for measuring the voltage of the DC power supply unit, a communication delay between the voltage measurement circuits is calculated and added to a diagnosis of a voltage detection level.

* * * * *